Jan. 17, 1950 W. W. WALDEN 2,495,040
VALVE STEM DISLODGING TOOL
Filed Sept. 26, 1947 2 Sheets-Sheet 1

INVENTOR.
Willis W. Walden
BY
Munn, Liddy, Slocum & Rich
Attys.

Patented Jan. 17, 1950

2,495,040

UNITED STATES PATENT OFFICE 2,495,040

VALVE STEM DISLODGING TOOL

Willie W. Walden, Hugo, Okla.

Application September 26, 1947, Serial No. 776,238

1 Claim. (Cl. 81—3)

This invention relates to valve stem tools; and has for one of its important objects the provision of simple, efficient, inexpensive and reliable means by which the valve-stem of an automobile tire may be so backed into the tire and lodged therein, preparatory to the removal of the tire from its associated wheel or rim, as to permit the tire to be removed without subjecting the valve-stem to possible damage.

To the above and other ends, the present invention contemplates a guide sleeve, one end of which is adapted to receive the outer end of a valve-stem, normally protruding from the tire by way of the valve-stem opening provided in the usual automobile wheel rim, the valve-stem receiving end of said sleeve being adapted to be introduced into the tire by way of said valve-stem opening, and said sleeve being provided with a displacing plunger slidably mounted therein and adapted to engage the outer end of said valve-stem as the sleeve is introduced into the tire by way of said valve-stem opening, whereby said valve-stem is then backed into the tire, said plunger being associated with actuating means by which the plunger may be displaced longitudinally of itself while engaging the valve-stem and while said sleeve, after being introduced into the tire, is tilted with respect to the longitudinal axis of the valve-stem so that said valve-stem may be ejected from said sleeve under the action of said plunger and simultaneously moved thereby to an off-center position with relation to the valve-stem opening.

Figure 1:
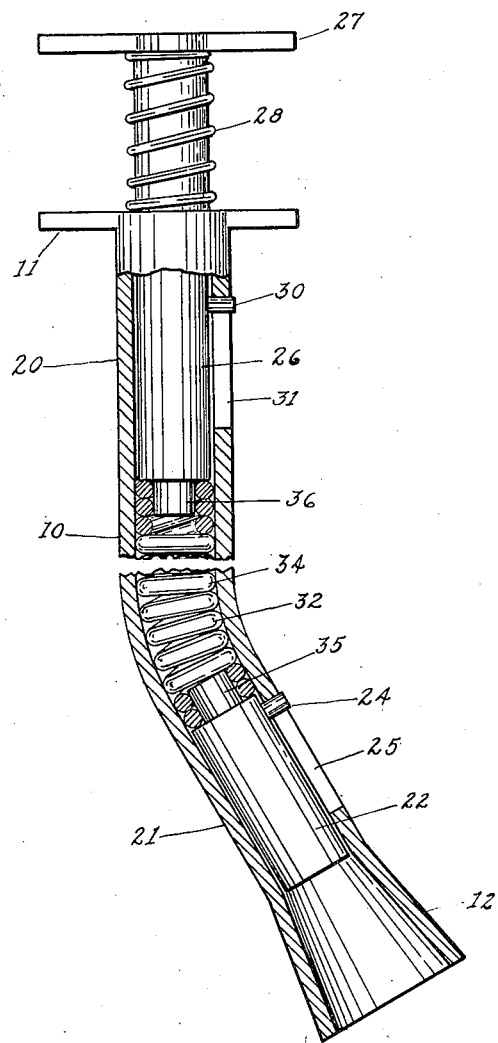

Other objects and advantages of the invention will become apparent from the following description when taken in connection with the accompanying drawings, in which Figure 1 is a central longitudinal sectional view of a valve-stem tool embodying the present invention.

Figure 2:
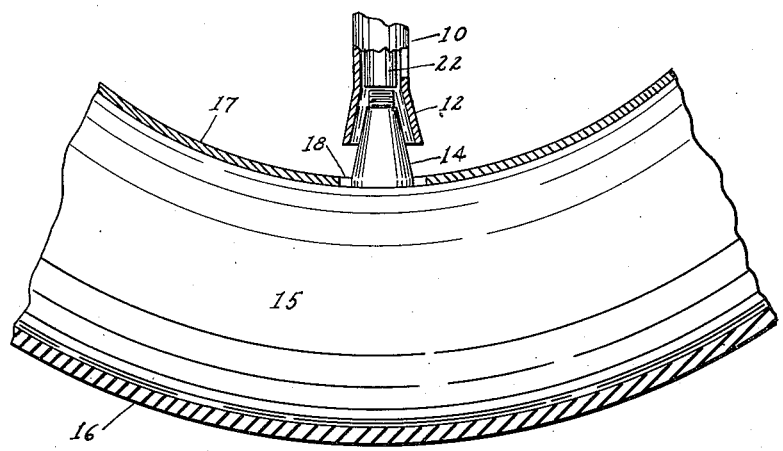
Figure 3:
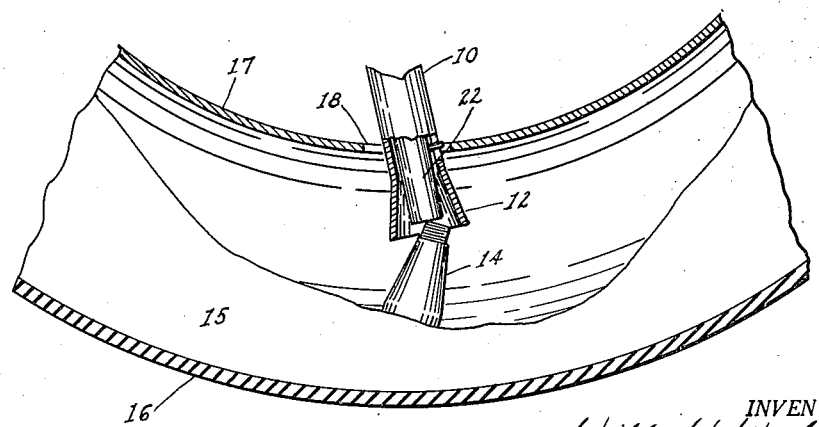

Figure 2 is a fragmental view, showing, partly in section and partly in elevation, the valve-stem tool applied to the valve-stem of an automobile tire to be conditioned for removal from its associated wheel rim, and Figure 3 is a view similar to that of Figure 2 and illustrating the manner in which the tool is employed to lodge the valve-stem within the tire as a final step in conditioning the tire for removal from its associated rim.

The valve-stem tool herein illustrated as an embodiment of the present invention includes a sheath-like guide sleeve 10, provided at one end with a cross handle 11 and at its opposite end with an outwardly flared socket-like cup 12, simulating the frustrum of a cone and adapted to receive the outer or cap-end of a tire valve-stem 14, such as is customarily employed in connection with the conventional inner tube 15, shown in Figs. 2 and 3 as confined within an automobile tire 16, mounted on an automobile rim 17, provided with the usual valve-stem opening 18, through which the valve-stem normally projects.

As shown in Figure 1, the guide sleeve 10 is bent or curved at a point relatively near the cup 12, so that the straight-away portions 20 and 21 of the sleeve adjacent the point at which it is bent or curved are disposed at an angle to each other in order that the tool may be adapted for use with any tire valve-stem, regardless of the point or the angle at which such valve-stem may project from the tire while mounted on its associated wheel rim.

Within the straight-away portion 21 of the guide sleeve 10, there is carried a slidable valve-stem displacing plunger 22, one end of which is normally disposed in the vicinity of the juncture of the cup 12 with said sleeve, and to the other end of which is connected a guide pin 24, projecting through an elongated slot 25 provided in the wall of said straight-away portion and adapted to function in conjunction with said pin to prevent said displacing plunger from rotating at it is moved back and forth within said sleeve and to limit said plunger against undue longitudinal displacement.

Carried within the straight-away portion 20 of the guide sleeve 10, is an operating plunger 26, which is adapted to be moved longitudinally of itself and the outer end of which normally projects well beyond the adjacent end of said guide sleeve. In order to facilitate inward movement of the operating plunger 26, it is provided at its outer end with a cross-handle 27, between which and the adjacent cross-handle 11 is disposed a compression spring 28, which encircles the outer end of said operating plunger and serves to retract that plunger incident to the release of any manually exerted operating force applied in effecting displacement of the operating plunger in an opposite direction, as when the cross-handles 11 and 27 are grasped in one's hand and forced toward each other in opposition to the thrust exerted by said spring. The operating plunger 26 is provided intermediate its ends with a guide pin 30, projecting through an elongated slot 31 formed in the wall of the straight-away portion 20 of the guide-sleeve 10 and adapted to function in conjunction with said pin to prevent said operating plunger from rotating as it is moved back and forth within said sleeve.

In order that the displacing plunger 22 may be reciprocated in accordance with such reciprocatory movement as is imparted to the operating plunger 26, these two plungers are connected together by a flexible, but yet substantially non-extensible, plunger section 32, herein illustrated as comprising a coiled wire cable 34, the convolutions of which intimately engage each other and the outer diameter of which is equal to that of the respective plungers 22 and 26. The connection between the plungers 22 and 26 may be conveniently made, as will be readily understood, by suitably anchoring the opposite ends of the cable 34 to a pair of pin-like shanks 35 and 36 carried by and projecting from the inner ends of the respective plungers in a coaxial relation thereto.

From the foregoing, it will be understood that, since the plunger section 32 is flexible, it will readily follow the curvature of the bent portion of the guide sleeve 10 as the plunger 26 is reciprocated; and that, since the flexible section 32 is substantially non-extensible, the plunger 22 will be reciprocated in accordance with and to the extent of such longitudinal displacement as may be imparted to the plunger 26.

The tool herein illustrated as an embodiment of the present invention may be employed to advantage in removing a tire from its associated wheel rim by placing the socket-like cup 12 over the valve stem 14, as shown in Fig. 2, and then projecting the tool through the valve-stem opening 18 while the outer end of the plunger 22 engages the outer or cap-end of the valve-stem 14. The enlarged cup or shaped end 12 of the instrument is an important element in its construction in that it insures the guiding of the valve stem inwardly in a straight line in the first instance and thereafter permitting said stem to be tilted sidewise, without becoming locked in the end of the tube, and finally readily ejected by the plunger 22.

By reason of the engagement that is maintained between the plunger 22 and the valve stem 14 as the cup 12 enters the tire 16, the inner tube 15 may be collapsed, as shown in Fig. 3, to a sufficient extent to permit the valve stem to assume a position wholly within the tire, whereupon the tool is tilted and the plunger 26 is displaced by moving the cross-handle 27 toward the cross-handle 11 against the action of the spring 28. Such displacement of the plunger 26 causes a corresponding displacement of the plunger 22, with the result that the valve-stem 14 is ejected from the cup 12 and simultaneously moved to an off-center position with relation to the valve-stem opening 18, thus lodging the valve-stem wholly within the tire so that tire, after removing the tool from the opening 18, may be dismounted from its associated wheel rim 17 without subjecting the valve-stem to possible damage in carrying out the tire-removing process.

Although only one form of the invention is herein shown and described, it will be understood that various changes may be made with respect to the present disclosure without departing from the spirit of the invention or the scope of the following claim.

I claim:

A valve-stem tool for backing a valve-stem into a rim mounted tire and for lodging the same therein and comprising a guide sleeve bent at an obtuse angle intermediate its length, the forward end of which is frustro conical shaped to receive the valve-stem normally protruding from the valve stem opening in the rim said forward end adapted to be introduced into the tire by way of said valve-stem opening, a displacing plunger slidably mounted within the inner end of said sleeve and adapted to engage the outer end of said valve-stem as said sleeve is introduced into the tire by way of said valve-stem opening, whereby said valve-stem is backed into said tire, plunger actuating means at the outer end of the sleeve, and a flexible connection between the plunger and the actuating means for displacing said plunger longitudinally of itself while engaging said valve-stem and while said sleeve, after being introduced into the tire, is tilted with respect to the longitudinal axis of said valve-stem so that said valve-stem may be ejected from the frustro conical end of said sleeve under the action of said plunger and simultaneously moved thereby to an off-center position with relation to said valve-stem opening.

WILLIE W. WALDEN.

REFERENCES CITED

The following references are of record in the file of this patent:

UNITED STATES PATENTS

| Number | Name | Date |
| --- | --- | --- |
| 1,415,865 | Brown | May 16, 1922 |
| 1,508,725 | Schloesser | Sept. 16, 1924 |
| 1,539,221 | Tenant | May 26, 1925 |
| 1,798,221 | Porwoll | Mar. 31, 1931 |